Figure 1:
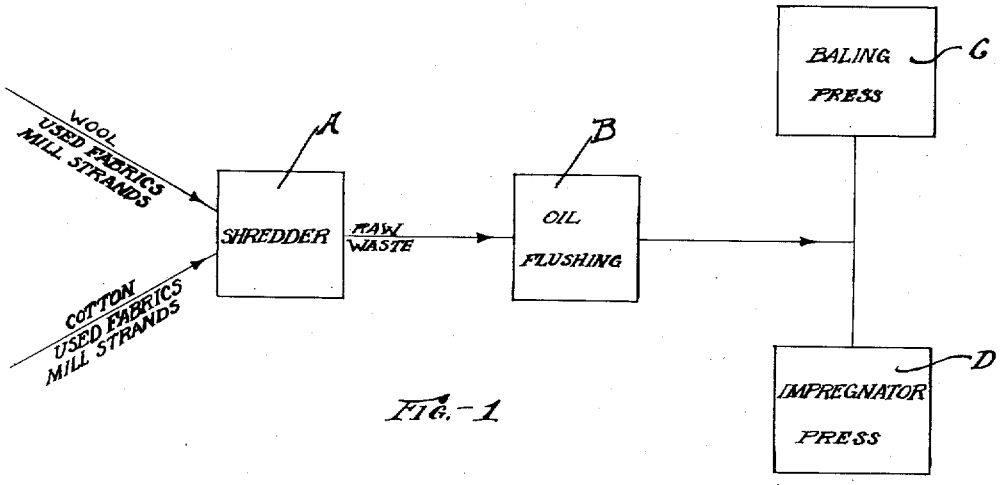

Sept. 13, 1932.

E. S. PEARCE

METHOD OF CONDITIONING WASTE

Re. 18,599

Original Filed June 7, 1928

INVENTOR

BY Edwin S. Pearce

Brockett & Hyde

ATTORNEYS

Reissued Sept. 13, 1932

Re. 18,599

UNITED STATES PATENT OFFICE

EDWIN S. PEARCE, OF INDIANAPOLIS, INDIANA, ASSIGNOR TO RAILWAY SERVICE AND SUPPLY CORPORATION, OF INDIANAPOLIS, INDIANA, A CORPORATION OF INDIANA

METHOD OF CONDITIONING WASTE

Original No. 1,779,011, dated October 21, 1930, Serial No. 283,725, filed June 7, 1928. Renewed August 25, 1930. Application for reissue filed February 26, 1932. Serial No. 595,609.

This invention relates to a method for conditioning waste for use as a carrier for oil for the lubrication of railway car journals and other objects commonly lubricated with such oil carrying waste.

One grave objection to the use of waste for supplying oil to the journal surface to be lubricated is the danger of hot boxes, due to the failure of the waste to deliver the lubricant to the journal surface. For some time past it has been assumed that such failures of the waste have been caused by sand, grit, or metal particles or fragments collected by the waste during use or as part of its original composition, or by short worn fibres, any of which may become compacted against the rotating surface and shield it from the lubricant. The waste was assumed to consist of relatively long wool and cotton fibres so completely interlaced as to form a yielding fibrous body to compel travel of the lubricant in all directions and hence to the journal bearing, and it was believed that these long fibres were broken or torn in use to smaller sizes having a tendency individually to lodge without motion in a given zone of the rotating surface and prevent its lubrication.

My investigation leads me to the conclusion that more serious and harmful results are produced and many hot boxes are caused by another ingredient of the waste heretofore not taken into consideration, to wit, the lint, which is very fine textile material, either wool or cotton, or both, including the very fine fibres and fibrous fragments, much smaller in size than the so-called short fibres and either in the raw waste in the beginning or resulting from normal tear or wear of the longer more efficient fibres during use of the waste. Under a high powered microscope magnifying twenty or more diameters a single useful strand or fibre of waste appears in the field as a heavy solid line and the lint looks like the finest hairs spreading out from the strand in all directions and of very small diameter as compared with the strand itself. This fine lint is not firmly anchored and becomes detached and in the presence of lubricating oil during use in the journal box it floats freely with the liquid toward the surface to be lubricated and ultimately mats together like felt, forming what might be referred to as an impenetrable filter bed, which blocks or undesirably retards lubricant flow by shutting off the ability for capillary action from fiber to fiber to develop. The result is to pile up this filtering lint within the waste body or against the rotating journal with a failure of lubrication, rise in temperature, charring and burning of the lint and nearby oil and waste, and the production of a tarry residue from the oil, these effects becoming cumulative until finally lubricant flow is completely shut off and a hot box develops. I have discovered that the tendency of the lint to move with the oil may be taken advantage of to effect the removal of the lint from the waste by using the lubricant as a vehicle to remove the lint, as will appear.

Of course, in the preparation of waste for lubricating purposes, there is no objection to removing therefrom short fibres, sand, grit, metal fragments, or other mechanical impurities, either from new unused waste, if such are present, or from used waste during the process of reclamation or renovation thereof. Their presence is objectionable, and efficient waste should be clean and of uniform texture. Nevertheless, according to my investigations and experience in practice, the danger which dictates the removal of such materials is over-shadowed by a greater necessity for eliminating, or at least reducing, the amount of lint in new waste before it is supplied to its first bearing, as well as its subsequent removal, should it reappear for any reason, in any later renovation or cleaning after use.

To that end the present invention has for its object the provision of lint-free waste by a method which eliminates or materially reduces the lint content by removing it with a liquid, which has no deleterious effect upon the waste and does not interfere with its intended use, such a liquid as lubricating oil, which not only enables the method to be carried out conveniently and at low cost, but also advances the waste toward its finished form suitable for use in lubrication.

Figure 2:
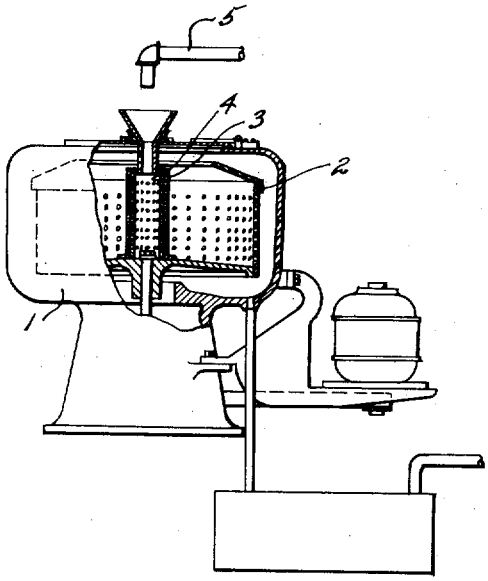
Figure 3:
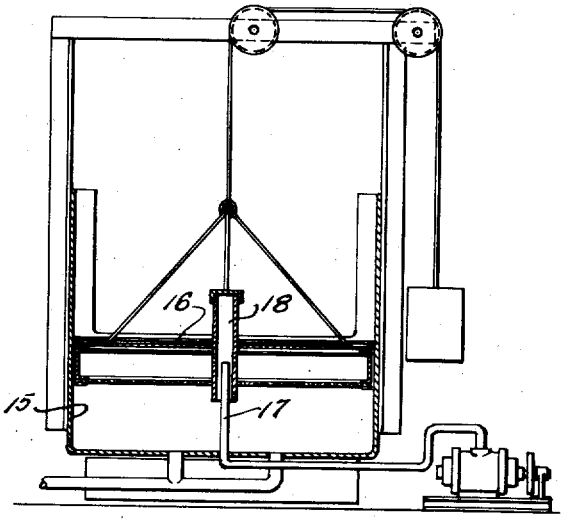

In the drawing, Fig. 1 is a diagrammatic view of one system or organization of apparatus for practicing the method; and Figs. 2 and 3 are detail views more or less conventionally representing different parts of the apparatus.

Waste employed for lubricating purposes includes either wool or cotton fibres or both. It is usually produced from used fabrics containing various dyes and from mill strands. Such material, with any desired or convenient proportions of wool and cotton, and of course washed and dried by ordinary laundry practices, where necessary to remove dirt, is shredded or torn to reduce it to fine fragments and to open up and separate from each other the threads or fibres of the textile fabric so that its weave entirely disappears. This step is performed in any suitable or desirable shredding or tearing machine indicated conventionally at A.

The product of this machine may be termed "raw waste", or "unoiled waste". It has been used heretofore for many purposes and is the product customarily employed without change for journal box lubrication by mixing therewith a proper quantity of lubricating oil. When applied to the treatment of raw waste, the invention contemplates the elimination or removal of the lint before the waste is used for journal box lubrication.

The lint is removed from raw waste before it is supplied to its first bearing, or during renovation or cleaning of the waste after its use in a bearing, as heretofore referred to, by flushing it out with the same kind of lubricating oil which is later valuable for lubricating purposes in the journal box to which the waste is supplied. By merely plunging the waste into a bath of oil and poling it around and around, or by agitating it in a bath of oil in a suitable machine, such as an ordinary drum type washing machine, or by supplying the oil to the waste in any other suitable way, the lint becomes suspended in the oil, whereas the useful fibres of textile fabric will settle or can be collected. The lint is so small that it will even pass through fairly fine filters. It is therefore suitable to remove the lint from the waste by flushing or washing with an excess of oil. One suitable apparatus for the purpose is an ordinary centrifugal extractor to which oil may be continuously supplied and caused to pass through the waste. Such a machine is shown at B, Fig. 1, and in Fig. 2 and for example, may be of the type illustrated in the patent of John W. Bercaw, for centrifugal machine, granted August 28, 1928, No. 1,682,473, to which reference may be had for a more complete description if necessary.

The machine shown in Fig. 2 comprises a suitable stationary curb or casing 1 in which is a rotatable basket or container 2 adapted to receive a charge of the waste and provided with a perforated or foraminous outer wall. Along the central axis of the basket are two perforated cylinders in telescopic or nested relation, the outer one 3 being stationary and the inner one 4 being adjustably rotatable to produce more or less registration of the openings in the two cylinders, and which cylinders form a distributor for the oil supplied to the waste, which is delivered to the machine by the pipe 5. In the extractor basket is placed a charge of waste for removal of the lint therefrom. Some oil may be delivered to the waste before the machine is started, although this is not always essential, but in any event, after the basket is rotating oil is supplied to the central distributor and rises in the same to its top, centrifugal force causing it to flow out at all levels through the registering openings in the two cylinders, which are relatively adjusted in accordance with the speed of rotation and the viscosity of the oil, to produce the proper supply. The oil may be heated to reduce its viscosity and increase its ability to penetrate the waste and wash out lint, if desired. The feed of oil is continued for a proper period and during the treatment the oil penetrates the waste and by centrifugal force is caused to travel through the same, taking up the lint in suspension and carrying it out through the perforations or foraminations of the basket wall. In this way practically all of the lint may be washed out. The supply of oil is shut off and the extracting operation is continued to reduce to a minimum the quantity of the remaining oil since it is obviously desirable to remove as much of the lint-containing oil as possible.

By extracting the oil to as low an amount as possible the small amount remaining after a reasonably protracted extraction is merely that which saturates the fibres themselves, and the fibre saturated waste runs quite uniform in oil content so that it is readily impregnated at the point of use by adding a known quantity of oil, making it possible to ship the fibre saturated waste long distances in compact form and without oil loss.

The purpose of the cylinders 3, 4 is merely to insure retarded flow of the oil to the waste so as to build up a quantity in said cylinders and supply oil to the upper layers of waste in the extractor as well as to the bottom, and obviously the oil may be supplied to the extractor directly from a hose or nozzle or other supplying device and played over the waste while the basket is rotating.

In the oil flushing or washing step, it is necessary to set the lint free and suspend or entrain it in the oil in a mobile condition so that it will flow with it. Experience shows that if a given batch of waste is treated with a given charge of oil and the latter is applied to the waste again and again, such as by repeated circulation, the oil body collects more and more lint until finally the proportion of lint in the oil probably reaches a maximum, after which further re-circulation or continued treatment seems to be without lint collecting benefit. Oil used to treat waste containing a small quantity of lint might well collect a definite maximum quantity of lint from such waste by repeated circulation and find its level or stable value of lint content, but the same oil used on such waste might collect additional lint if used for treating waste containing a higher lint content. The present invention contemplates any repeated application of oil to waste, such as by re-circulation or otherwise, to a useful degree, but aims to avoid re-use of the oil for lint removal after it has collected its maximum quantity of lint under any given conditions or, in other words, to avoid any use of the lint laden oil upon waste which might permanently restore to the waste some removed lint, the whole purpose of the invention being to remove the lint and permanently keep it out. Where to stop re-circulation or repeated oil treatment depends upon several factors, such as the viscosity of the oil, its temperature, the physical character of the waste, the total lint content, the relative volume of oil bath to waste being treated, etc.

The oil that has been used for treating waste by a flushing or washing step, so as to reduce the lint content of the waste to as low a value as possible, is not again applied to waste unless there is the possibility of removing additional lint from such waste, but, rather, is first suitably treated to remove its lint content and therefore renew its lint collecting ability, or, on the other hand, may sometimes be used for other industrial purposes where lint content is not objectionable.

Removal of the lint from the oil may be carried out in any suitable manner, such as by the method of reclaiming or renovating mineral lubricating oils described in the Grisbaum Patent No. 1,791,474, granted March 3, 1931, to which patent reference may be had for a more complete description of the process if desired. For the present it is sufficient to say that by said Grisbaum method the oil to be cleaned or renovated and containing dirt, grit and lint in emulsified form or in suspension is treated with a solution of caustic soda, usually while heated, the effect of which is to break down or destroy part of the lint, such as the woolen or animal fibres, and precipitate the remainder, such as cotton or vegetable fibres. Washing with cold water removes the soluble or broken down material and throws down the undissolved lint with the sludge. The clear oil remaining floats on top of the water and is removed and heated with the application of a suction or vacuum effect, which dehydrates the oil without the creation of any emulsion, leaving the oil lint-free and in proper form for re-application to further waste from which lint is to be removed, such as by supplying it to the extractor feed pipe 5.

Having removed the lint by flushing or washing with lubricating oil, the now lint-free waste is ready for shipping or transportation to the place of use. It may be charged with its oil content reduced to a minimum into an ordinary baling press, indicated conventionally at C, where it is baled and tied in the usual manner of materials of this kind. The baling of course protects all of the internal fibres and prevents the access of moisture to anything except the outer layer which, of course, may also be protected with a suitable impervious wrapper, so that the lint-free waste with its reduced oil content may be shipped to the place of use and there mixed with a suitable quantity of clean lubricating oil in any desired manner to bring the oil content up to the amount necessary for journal box lubrication.

If desired, the lint-free waste may immediately be impregnated with a proper quantity of oil before it is packed or shipped. This may be accomplished in what is known as an impregnator press, indicated conventionally at D, Fig. 1, and in Fig. 3, and which press, for example, may be of the form shown, described and claimed in my Prior Patent, No. 1,723,747, granted August 6, 1929. Briefly described, this impregnator press includes a cylindrical tank or chamber 15 open at its top and containing a removable piston 16 capable of being drawn downwardly by the vacuum or suction effect produced in the chamber beneath it by a source of suction communicating with a pipe 17 extending up within the chamber and entering a hollow extension 18 of the piston. The waste to be impregnated, in definite or measured quantity, is placed in the chamber and a proper measured quantity of oil is added to it, either above or below it. The suction effect is now applied to cause the piston to move down, all air leaving the chamber so that the oil flows into the finest interstices and crevices, not only between the fibres, but actually within them. This vacuum impregnation has the further advantage of removing any last traces of moisture that may be present, because the oil is usually hot, and the waste may also be hot, and at the higher temperature, say 190° F. or so, the moisture boils off as vapor and is thereby removed. At the same time the mass is compacted and in a sense is baled and can be removed and packaged as finished lubricating waste ready for use in a journal box.

One important attribute of the invention, of course, is the removal of lint from waste by flushing or washing the waste with lubricating oil, to carry away the lint, coupled with which may be the partial or whole impregnation of the lint-free waste with lubricating oil for use in the journal box, the product being a compact mass of lint-free waste containing some or all of the necessary oil, but which in any event is free from lint and therefore reduces liability of hot boxes when it is used in journal boxes for lubricating purposes.

Another attribute is the possibility of supplying the waste, after introducing it into a container, with practically unlimited quantities of heated oil which is caused to forcibly pass while in said same container, through and out of the waste and out of said container, with the production of a sort of "scouring effect" upon the waste fibres which removes a large proportion of the impurities or objectionable content of the waste, all with the effect of producing a cleaner, better and more efficient lubricating material.

What I claim is:

1. The herein described steps of a method of conditioning unoiled waste for use in journal boxes, consisting in the step of subjecting said waste to lubricating oil capable of collecting or entraining the lint in said waste; and the succeeding step of removing from said waste as much as possible of said oil with its entrained or collected lint.

2. The herein described steps of a method of conditioning unoiled waste for use in journal boxes, consisting in the step of subjecting said waste to lubricating oil capable of collecting or entraining the lint in said waste; the succeeding step of removing from said waste as much as possible of said oil with its entrained or collected lint; and the succeeding step of treating the oil thus removed to remove therefrom the lint therein, thereby rendering said oil suitable for reuse as a lint-collecting medium.

3. The herein described steps of a method of conditioning unoiled waste for use in journal boxes, consisting in the step of subjecting said waste to substantially lint-free lubricating oil to collect the lint in said waste; the succeeding step of removing from said waste, by an extracting operation, as much as possible of said oil with its entrained or collected lint; and the succeeding step of treating the oil thus removed to remove therefrom the lint therein, thereby rendering said oil suitable for reuse as a lint-collecting medium.

4. The herein described steps of a method of treating waste for use in journal boxes, which consist of the step of placing the waste in a container; the step of delivering heated oil into said container for entry into said waste placed therein; and the succeeding step of causing, while said waste is yet in said container, an appreciable portion of the oil then in said waste to forcibly pass through and out of said waste and out of said container, the oil thus removed carrying with it at least some of the objectionable content of said waste.

5. The herein described steps of a method of treating waste for use in journal boxes, which consist of the step of placing the waste in a container; the step of delivering heated oil into said container for entry into the waste placed therein, said waste being moved during such oil delivery to effect better distribution of said oil into said waste; and the succeeding step of causing, while said waste is yet in said container, an appreciable portion of the oil then in said waste to forcibly pass through and out of said waste and out of said container, the oil thus removed carrying with it at least some of the objectionable content of said waste.

6. The herein described steps of a method of treating waste for use in journal boxes, which consist of the step of placing the waste in a perforated container; the step of delivering heated oil into said container for entry into the waste placed therein; and the succeeding step of rotating said container to cause an appreciable portion of the oil then in said waste in said container to forcibly pass by centrifugal force through and out of said waste and out of said container through the perforations thereof, the oil thus removed carrying with it at least some of the objectionable content of said waste.

7. The herein described steps of a method of treating waste for use in journal boxes, which consist of the step of passing hot oil through said waste while rotating the waste in the basket of a centrifugal machine; the succeeding step of extracting from said waste the major portion of the oil thereof; and the succeeding step of immersing said waste in hot oil to remove moisture therefrom.

8. The herein described steps of a method of treating waste for use in journal boxes, which consist of the step of placing the waste in a perforated container; the step of rotating said container and during such rotation delivering heated oil into said container for entry into the waste placed therein, the rotation of said container during such oil delivery effecting better distribution of the oil into said waste; and the succeeding step of causing, while said waste is yet in said container, an appreciable portion of the oil then in said waste to forcibly pass through and out of said waste and out of said container through the perforations thereof, the oil thus removed carrying with it at least some of the objectionable content of said waste.

In testimony whereof I hereby affix my signature.

EDWIN S. PEARCE.